(12) United States Patent
Tetsumoto

(10) Patent No.: US 8,871,000 B2
(45) Date of Patent: Oct. 28, 2014

(54) ELECTRIC FURNACE FOR PRODUCING MOLTEN METAL HAVING MATERIAL RECYCLING CAPABILITY

(75) Inventor: Masahiko Tetsumoto, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 475 days.

(21) Appl. No.: 13/305,876

(22) Filed: Nov. 29, 2011

(65) Prior Publication Data

US 2012/0297925 A1    Nov. 29, 2012

Related U.S. Application Data

(60) Provisional application No. 61/418,042, filed on Nov. 30, 2010.

(51) Int. Cl.
| | | |
|---|---|---|
| *C22B 11/10* | (2006.01) | |
| *C22B 11/08* | (2006.01) | |
| *C21C 5/56* | (2006.01) | |
| *F27B 3/08* | (2006.01) | |
| *C21B 13/06* | (2006.01) | |
| *C22B 5/02* | (2006.01) | |
| *C21C 5/52* | (2006.01) | |

(52) U.S. Cl.
CPC . *C22B 5/02* (2013.01); *C21C 5/567* (2013.01); *F27B 3/085* (2013.01); *C21B 13/06* (2013.01); *C21C 5/5252* (2013.01)
USPC .............. 75/414; 75/503; 75/10.65; 75/10.66

(58) Field of Classification Search
CPC .... C21B 13/004; C21B 13/10; C21B 13/085; C21B 13/12; C21B 13/0006; C21B 13/0066; C21B 13/023; C21B 11/00; C21B 5/008
USPC ........... 75/484, 526, 576, 475, 485, 492, 504, 75/571, 581, 433, 436, 446, 458, 460, 461, 75/464, 468, 469, 471, 476, 483, 491, 494, 75/496, 499, 500, 503, 507, 560, 573, 75/584; 373/72, 81, 33, 71, 9
See application file for complete search history.

(56) References Cited

U.S. PATENT DOCUMENTS

| | | |
|---|---|---|
| 3,288,590 A | 11/1966 | Keith et al. |
| 3,374,087 A | 3/1968 | Gray |
| 3,442,028 A | 5/1969 | Bergougnou |
| 4,168,156 A | 9/1979 | Shabalina et al. |
| 4,975,182 A | 12/1990 | Barefoot |

(Continued)

FOREIGN PATENT DOCUMENTS

JP    2009-280910    *    3/2009    .............. C21B 11/10

*Primary Examiner* — Kaj K Olsen
*Assistant Examiner* — Jared Wood
(74) *Attorney, Agent, or Firm* — Clements Bernard PLLC; Christopher L. Bernard; Lawrence A. Baratta, Jr.

(57) ABSTRACT

The present invention relates generally to a smelting operation or the like, by which molten metal is produced from a metal oxide after metal oxide agglomerates are directly reduced and melted with a carbonaceous material in an electric heating and melting furnace. More specifically, the present invention relates to an electric furnace for producing molten metal that has material recycling capability, especially in-process material recycling capability.

11 Claims, 5 Drawing Sheets

(56) References Cited

U.S. PATENT DOCUMENTS

| | | |
|---|---|---|
| 5,370,727 A | 12/1994 | Whipp |
| 5,669,955 A | 9/1997 | Vuletic et al. |
| 2003/0061909 A1 | 4/2003 | Negami et al. |
| 2010/0024598 A1 | 2/2010 | Roth et al. |

* cited by examiner

ELECTRIC FURNACE FOR PRODUCING MOLTEN METAL HAVING MATERIAL RECYCLING CAPABILITY

CROSS-REFERENCE TO RELATED APPLICATION(S)

The present patent application/patent claims the benefit of priority of U.S. Provisional Patent Application No. 61/418,042, filed on Nov. 30, 2010, and entitled "ELECTRIC FURNACE FOR PRODUCING MOLTEN METAL HAVING MATERIAL RECYCLING CAPABILITY," the contents of which are incorporated in full by reference herein.

FIELD OF THE INVENTION

The present invention relates generally to a smelting operation or the like, by which molten metal is produced from a metal oxide after metal oxide agglomerates are directly reduced and melted with a carbonaceous material in an electric heating and melting furnace. More specifically, the present invention relates to an electric furnace for producing molten metal that has material recycling capability, especially in-process material recycling capability.

BACKGROUND OF THE INVENTION

Various new iron and other metal-making processes have been proposed to replace conventional smelting and blast furnace reduction processes. These new iron and other metal-making processes involve pre-reducing metal oxide agglomerates with a carbonaceous material in a rotary hearth furnace to form reduced agglomerates, and then melting the reduced agglomerates in an arc furnace or submerged arc furnace. See, for example, WO/2000/513411, WO/2001/525138, WO/2001/525487, and WO/2003/105414.

However, in the processes that use an arc furnace as the melting furnace, metallization of the reduced agglomerates must be maintained at a high level and the fines ratio must be maintained at a low level to ensure high melting efficiency, refractory protection, excessive foamy slag formation suppression, and the like. Thus, using these processes, it has been difficult to increase the productivity of the rotary hearth furnace while maintaining higher metallization levels and lower fines ratio levels. Further, the facility associated with these processes is necessarily large.

By contrast, in the processes that use a submerged arc furnace as the melting furnace, the reduced agglomerates form layers, and damage to the refractory and excessive foamy slag formation are less problematic. Further, there are lesser limitations on the metallization and fines ratio levels, and the facility associated with these processes may be considerably smaller. However, in the processes that use a submerged arc furnace as the melting furnace, it is difficult to effectively use the chemical energy of the CO gas generated by the reduction step remaining in the reduced agglomerates. Thus, productivity cannot be sufficiently increased and operation cost cannot be sufficiently decreased.

In the processes that use a submerged arc furnace as the melting furnace, it is possible to omit the rotary hearth furnace pre-reduction step and charge the un-reduced metal oxide agglomerates, with the carbonaceous material, directly to the submerged arc furnace, such that the pre-reduction step and the melting step are performed in the same furnace. However, when the metal oxide agglomerates and carbonaceous material contain volatile metal elements in addition to nonvolatile metal elements that form the molten metal (i.e. when iron mill dust or the like is used as the metal oxide raw material), the volatile metal elements evaporated and removed from the reduced agglomerates in the lower region of the furnace re-condense in a low-temperature zone in the upper region of the furnace and circulate in the furnace by adhering to the reduced agglomerates and/or forming accretions on the walls of the furnace. Thus, it is possible that the volatile metal elements cannot be efficiently recovered from the exhaust gas. In addition, non-descending reduced agglomerates may cause operational problems.

Accordingly, in these processes, two steps are typically used (a pre-reduction step using a rotary hearth furnace and a melting step using an arc furnace or submerged arc furnace). These processes require facilities and equipment for transferring the reduced agglomerates from the rotary hearth furnace to the melting furnace, as well as two exhaust gas processing lines, i.e. one for the rotary hearth furnace and one for the melting furnace. Thus, facility and equipment cost is high, thermal loss is high, and total system energy consumption cannot be adequately minimized.

As a result, a method for producing molten metal using a stationary non-tilting electric furnace has been proposed in JP/2009/280910. This method involves using a raw material charging chute that is provided at one end of the furnace, width-wise, that is connected to the interior portion of the furnace through its upper portion, an electric heater that heats the lower portion of the furnace and is located opposite the raw material charging chute, width-wise, and a secondary combustion burner disposed at the upper portion of the furnace between the two ends, width-wise. The method includes forming a raw material layer by charging a predetermined amount of a carbonaceous material and/or metal oxide agglomerates with carbonaceous material containing a nonvolatile metal element that forms molten metal into the furnace using the raw material charging chute, with a downward sloping surface extending from one end of the furnace to the other, subsequently forming an agglomerate layer on the downward sloping surface by charging a predetermined amount of the metal oxide agglomerates with carbonaceous material into the furnace using the raw material charging chute, subsequently forming a molten metal layer and a molten slag layer in the furnace by heating the lower end of the agglomerate layer with the electric heater while allowing the agglomerate layer to descend along the downward sloping surface toward the lower end of the furnace by melting, and concurrently thermally reducing the agglomerate layer by radiant heat from secondary combustion by blowing oxygen-containing gas into the furnace to burn the CO-containing gas generated by the agglomerate layer.

This stationary non-tilting electric furnace is illustrated in FIG. 1. The furnace 10 is an arc furnace that has a substantially-rectangular cross-sectional shape, for example. Raw material charging chutes 12 and exhaust gas ducts 14 are connected to/through the top wall 16 of the furnace 10. Electrodes 18 that function as heaters are inserted through the top wall 16 of the furnace 10. The raw material charging chutes 12 are provided adjacent to both side walls 20 of the furnace 10, for example, with the electrodes 18 provided near the centerline of the furnace 10. Multiple raw material charging chutes 12 and electrodes 18 may be spaced along the length of the furnace 10. Secondary combustion burners 22 are also inserted through the top wall 16 of the furnace 10. Multiple exhaust gas ducts 14 and secondary combustion burners 22 may be spaced along the length of the furnace 10. Preferably, the exhaust gas ducts 14 are disposed closer to the raw material charging chutes 12 than the electrodes 18 in order to prevent oxidizing exhaust gas produced after secondary combustion from flowing towards the electrodes 18, thereby mitigating damage to the electrodes 18.

Referring to FIG. 2, in the side walls 20/bottom wall 24 of the furnace 10, near the centerline and distant from the raw material charging chutes 12 (i.e. distant from the raw material beds 30 (FIG. 1)), a metal tap hole 26 and a slag tap hole 28 are provided to facilitate the tapping of molten metal 32 (FIG. 1) and molten slag 34 (FIG. 1). The electrodes 18 are preferably of a three-phase alternating-current type that has desirable heat efficiency, as is typically used in steel-making electric arc furnaces. As an example, an array of six electrodes 18 may be used, consisting of three pairs of electrodes 18 each of a single phase. The tip portion 36 (FIG. 1) of each electrode 18 is preferably submerged in the agglomerate layers 38 (FIG. 1) disposed on the raw material beds 30, or submerged in the molten slag 34, while conducting the melting operation. As a result, melting can be accelerated by the effects of radiant heat and resistance heat, and damage to the interior surfaces of the furnace 10 that are not protected by raw material beds 30 can be minimized.

Referring to FIG. 3, in operation, it is necessary to control the material flow and the position of the melting area in the furnace 10. Thus, the raw material charging chutes 12 are equipped with outer chutes 40 including feeding ports 42 that may be telescoped or otherwise adjusted vertically. Each raw material charging chute 12 includes a hopper 44 for storing the raw material, an inner chute 43 connected to the hopper 44, and an outer chute 40 that can be telescoped or otherwise adjusted vertically on the inner chute 43. The lower portion of the agglomerate layer 38 may be adjusted to occur at a desired position by moving the outer chutes 40 and feeding ports 42 in a vertical direction, depending on the angle of repose of the agglomerate layer 38.

One problem that can occur is that fines can accumulate in the furnace 10. Fines enter the furnace 10 with the feed material and/or are generated in the furnace 10 due to movement of the layer, thermal stresses, etc. These fines are segregated in the furnace 10 and increase the angle of repose of the agglomerate layer 38. If the fines are not removed, then continuous operation of the furnace 10 over long periods of time cannot be maintained due to changes in the angle of repose and unstable material flow. Feed leg height adjustment, as described above, cannot be used to satisfactorily position and control the agglomerate layer 38 if excess fines have accumulated in the furnace 10. Thus, additional techniques to deal with fines have been proposed, such as: shocking the agglomerate layer 38 using a hammer or the like, utilizing air blasts, or utilizing other means to correct and control material flow disruptions. Again, continuous operation is necessarily limited if fines are not periodically dealt with and/or removed. In order to remove fines, operation of the furnace 10 must be halted and the top wall 16 (FIG. 1) or side walls 20 of the furnace 10 must be opened. This operation is difficult, as the furnace 10 is hot and the material may readily oxidize.

Thus, what is still needed in the art is an electric furnace for producing molten metal that has material recycling capability, especially in-process material recycling capability, such that fines or other material may be removed from the furnace periodically, without shutting it down for extended periods to allow for cooling, etc.

BRIEF SUMMARY OF THE INVENTION

In various exemplary embodiments, the present invention provides an electric furnace for producing molten metal that has material recycling capability, especially in-process material recycling capability, such that fines or other material may be removed from the furnace periodically, without shutting it down for extended periods to allow for cooling, etc.

In one exemplary embodiment, the present invention provides a method for producing molten metal from a raw material comprising metal oxide agglomerates by reduction and melting in a furnace, including: selectively removing a portion of the raw material from the furnace through one or more openings disposed in a bottom portion thereof such that a raw material bed or layer has predetermined characteristics over time. The one or more openings are coupled to one or more hoppers. The method also includes recycling the portion of the raw material removed from the furnace back to the furnace as part of the raw material bed or layer. Alternatively, the method includes recycling the portion of the raw material removed from the furnace back to the furnace as part of an additional raw material bed or layer. Optionally, the method includes adding an additive to the recycled material prior to reintroduction in to the furnace. Preferably, the furnace includes a plurality of raw material charging chutes, a plurality of exhaust gas ducts, and a plurality of electrodes protruding through a top wall thereof, with the raw material charging chutes disposed adjacent to side walls of the furnace and the electrodes disposed at or near a centerline of the furnace. The top wall of the furnace has a step like configuration comprising a plurality of substantially-horizontal treads and a plurality of substantially-vertical risers. The top wall of the furnace includes a plurality of secondary combustion burners protruding through selected substantially-vertical risers in a substantially-horizontal configuration. Alternatively, the top wall of the furnace includes a plurality of secondary combustion burners protruding through selected substantially-horizontal treads in a substantially-vertical configuration. Optionally, the selective removal is carried out while the furnace is in operation.

In another exemplary embodiment, the present invention provides a reduction and melting furnace for producing molten metal from a raw material comprising metal oxide agglomerates, including: one or more openings disposed in a bottom portion of the furnace for selectively removing a portion of the raw material from the furnace such that a raw material bed or layer has predetermined characteristics over time. The one or more openings are coupled to one or more hoppers. The furnace also includes means for recycling the portion of the raw material removed from the furnace back to the furnace as part of the raw material bed or layer. Alternatively, the furnace includes means for recycling the portion of the raw material removed from the furnace back to the furnace as part of an additional raw material bed or layer. Optionally, the furnace includes means for adding an additive to the recycled material prior to reintroduction in to the furnace. The furnace further includes a plurality of raw material charging chutes, a plurality of exhaust gas ducts, and a plurality of electrodes protruding through a top wall thereof, with the raw material charging chutes disposed adjacent to side walls of the furnace and the electrodes disposed at or near a centerline of the furnace. The top wall of the furnace has a step like configuration comprising a plurality of substantially-horizontal treads and a plurality of substantially-vertical risers. The top wall of the furnace includes a plurality of secondary combustion burners protruding through selected substantially-vertical risers in a substantially-horizontal configuration. Alternatively, the top wall of the furnace further includes a plurality of secondary combustion burners protruding through selected substantially-horizontal treads in a substantially-vertical configuration. Optionally, the selective removal is carried out while the furnace is in operation.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

The method of the present invention involves using a raw material charging chute that is provided at one end of the furnace, width-wise, that is connected to the interior portion of the furnace through its upper portion, an electric heater that heats the lower portion of the furnace and is located opposite the raw material charging chute, width-wise, and a secondary combustion burner disposed at the upper portion of the furnace between the two ends, width-wise. The method includes forming a raw material layer by charging a predetermined amount of a carbonaceous material and/or metal oxide agglomerates with carbonaceous material containing a non-volatile metal element that forms molten metal into the furnace using the raw material charging chute, with a downward sloping surface extending from one end of the furnace to the other, subsequently forming an agglomerate layer on the downward sloping surface by charging a predetermined amount of the metal oxide agglomerates with carbonaceous material into the furnace using the raw material charging chute, subsequently forming a molten metal layer and a molten slag layer in the furnace by heating the lower end of the agglomerate layer with the electric heater while allowing the agglomerate layer to descend along the downward sloping surface toward the lower end of the furnace by melting, and concurrently thermally reducing the agglomerate layer by radiant heat from secondary combustion by blowing oxygen-containing gas into the furnace to burn the CO-containing gas generated by the agglomerate layer. The method also includes allowing some amount of fines to periodically pass through discharge hoppers located at various positions along the lower portion of the furnace beneath the raw material and agglomerate layers. The method is refined by providing a step-like top portion of the furnace through which the secondary combustion burners are disposed.

Figure 1:
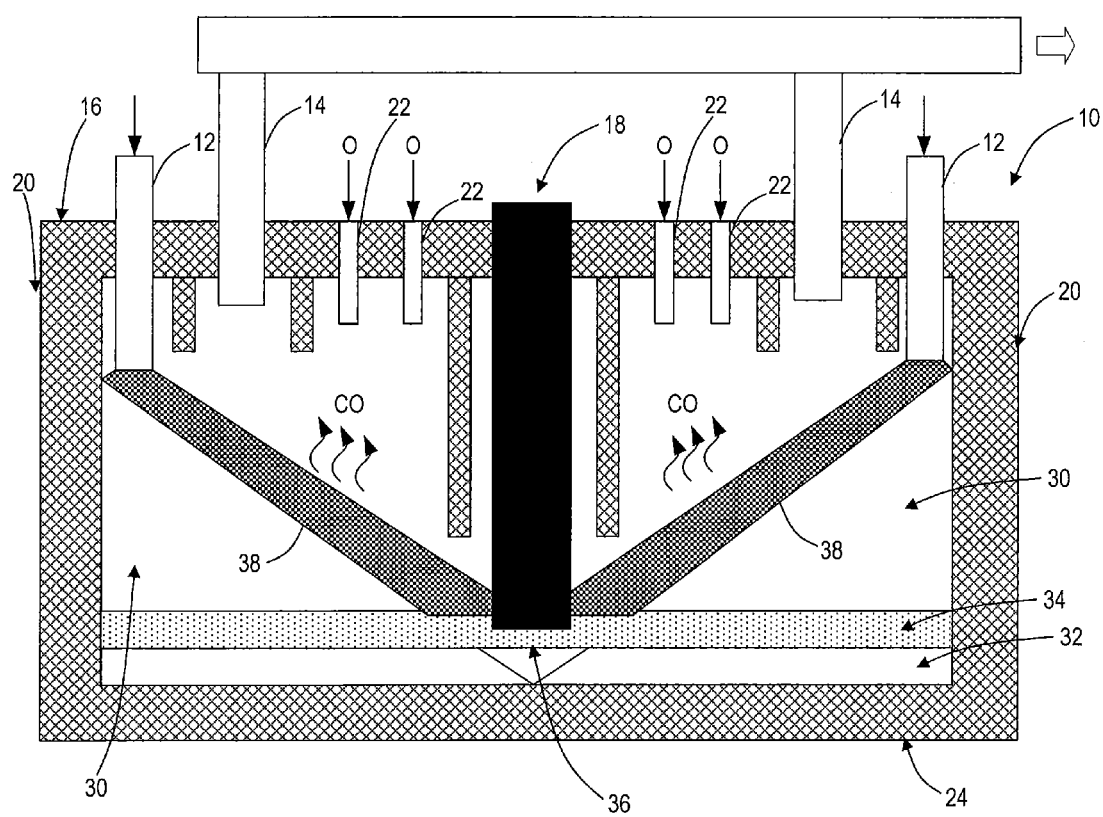
FIG. 1 is a schematic diagram (side view) illustrating one exemplary embodiment of a stationary non-tilting electric furnace for producing molten metal from metal oxide agglomerates and a carbonaceous material, the furnace including both a pre-reduction zone and a melting zone in a unified assembly.
Figure 2:
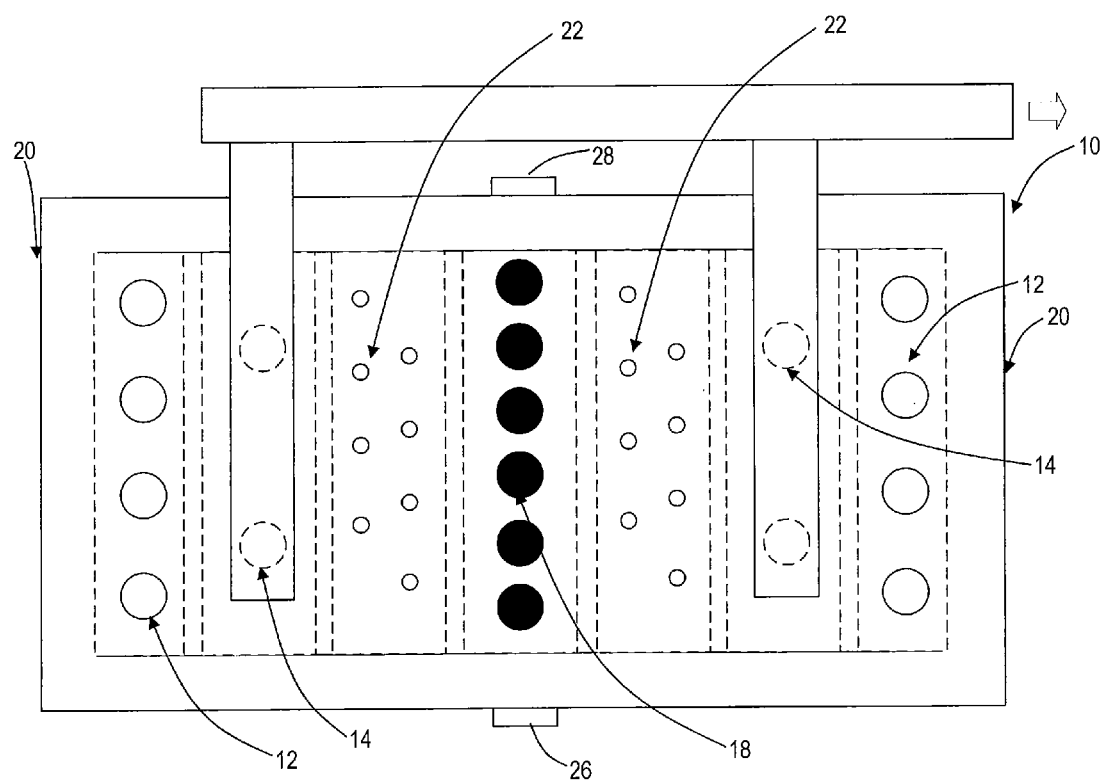
FIG. 2 is another schematic diagram (top view) illustrating the stationary non-tilting electric furnace of FIG. 1.
Figure 3:
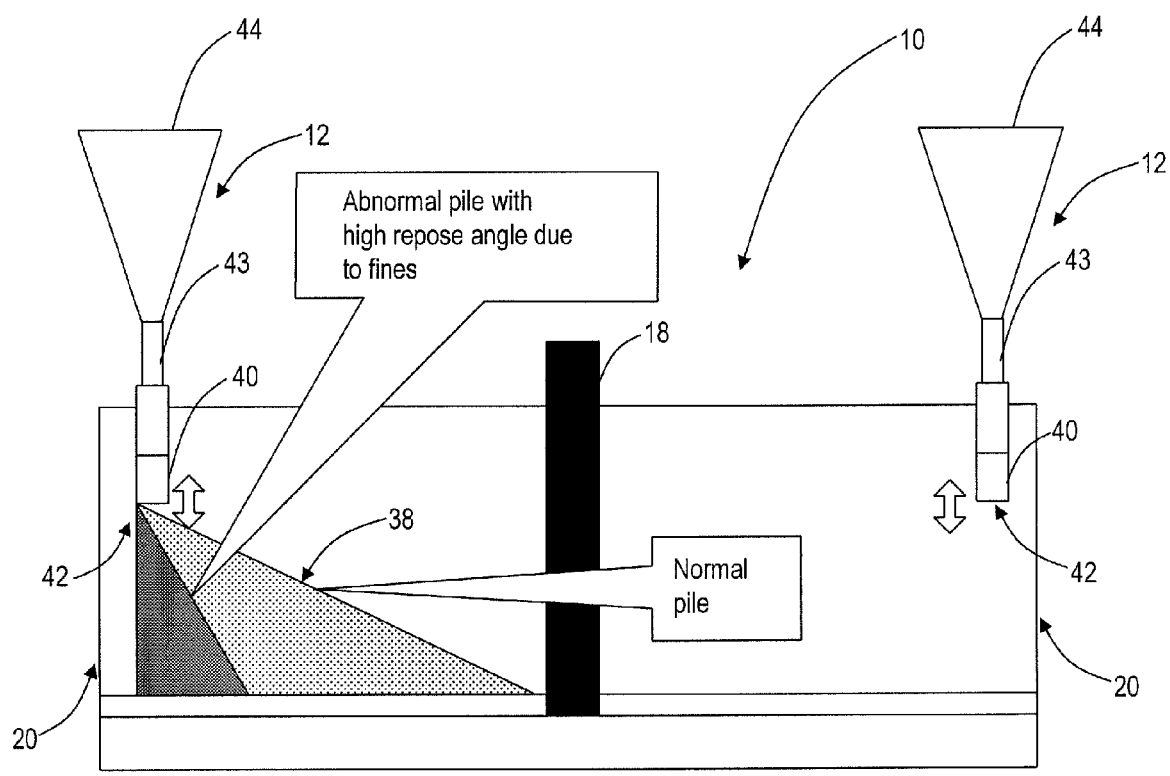
FIG. 3 is a further schematic diagram (side view) illustrating the stationary non-tilting electric furnace of FIGS. 1 and 2, FIG. 3 illustrating the problem associated with the accumulation of fines in the furnace during continuous operation.
Figure 4:
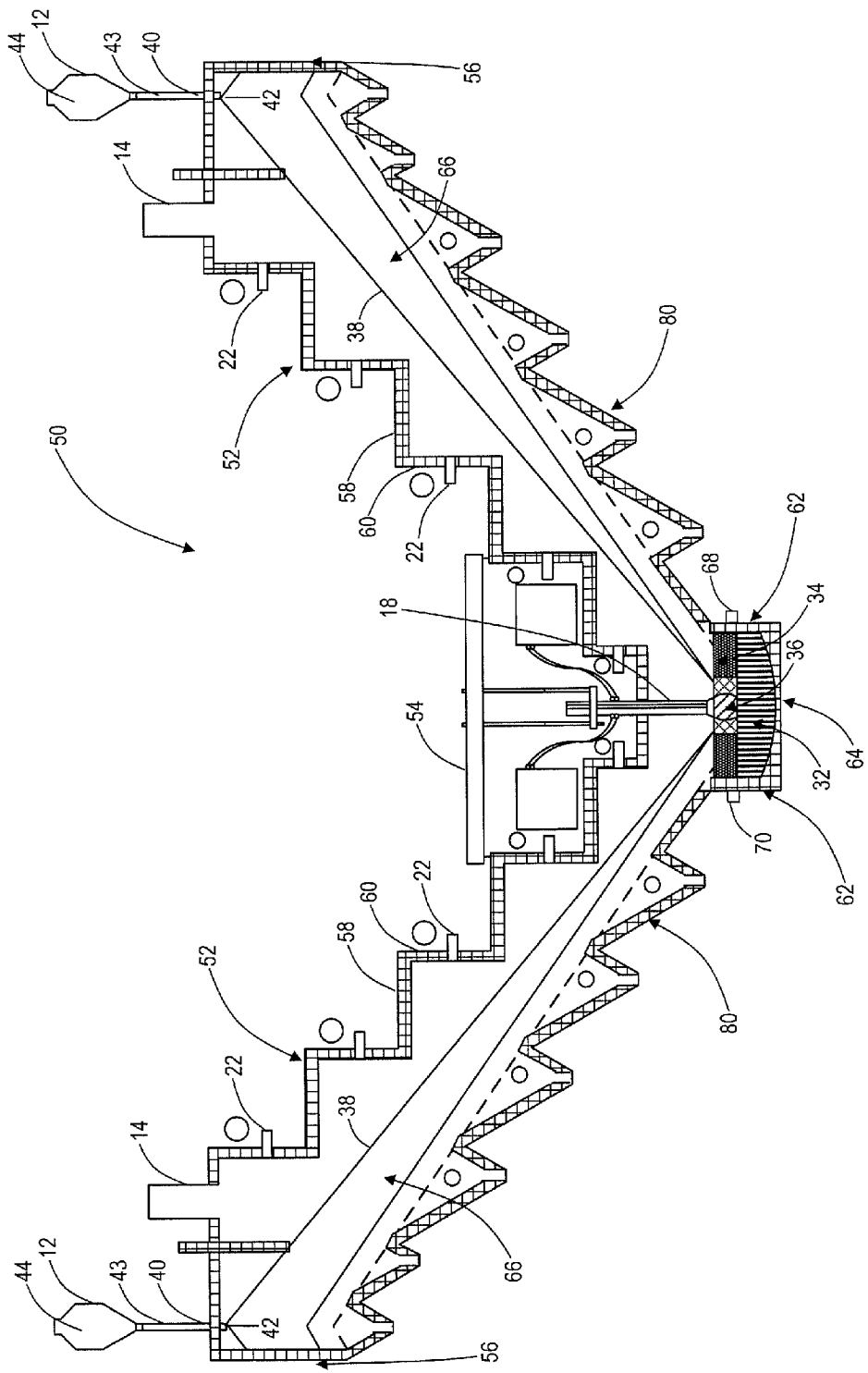
FIG. 4 is a schematic diagram (side view) illustrating one exemplary embodiment of the stationary non-tilting electric furnace of the present invention.

This stationary non-tilting electric furnace is illustrated in FIG. 4. The furnace 50 is an arc furnace that has a substantially-rectangular cross-sectional shape from above/below, for example. Raw material charging chutes 12 and exhaust gas ducts 14 are connected to/through the top wall 52 of the furnace 50. Electrodes 18 that function as heaters are inserted through the top wall 52 of the furnace 50. Preferably, these electrodes 18 are each coupled to an electrode lifting device 54 that is used to introduce the electrodes 18 into/extract the electrodes 18 from the interior portion of the furnace 50. The raw material charging chutes 12 are provided adjacent to both side walls 56 of the furnace 50, with the electrodes 18 provided near the centerline of the furnace 50. Multiple raw material charging chutes 12 and electrodes 18 may be spaced along the length of the furnace 50, as before. Secondary combustion burners 22 are also inserted through the top wall 52 of the furnace 50. Multiple exhaust gas ducts 14 and secondary combustion burners 22 may be spaced along the length of the furnace 50. Preferably, the exhaust gas ducts 14 are disposed closer to the raw material charging chutes 12 than the electrodes 18 in order to prevent oxidizing exhaust gas produced after secondary combustion from flowing towards the electrodes 18, thereby mitigating damage to the electrodes 18.

As illustrated in FIG. 4, the top wall 52 of the furnace 50 preferably has a step-like configuration or otherwise slopes from the raw material charging chutes 12 to the electrodes 18 on either side. Each step of this step-like configuration includes a substantially-horizontal tread 58 and a substantially-vertical riser 60. The secondary combustion burners 22 are disposed through the substantially-vertical risers 60 in a substantially-horizontal configuration, such that oxygen-containing gas is effectively injected in proximity to the agglomerate layers 38. It should be noted that the secondary combustion burners 22 could also be disposed through the substantially-horizontal treads 58 in a substantially-vertical configuration.

Figure 5:
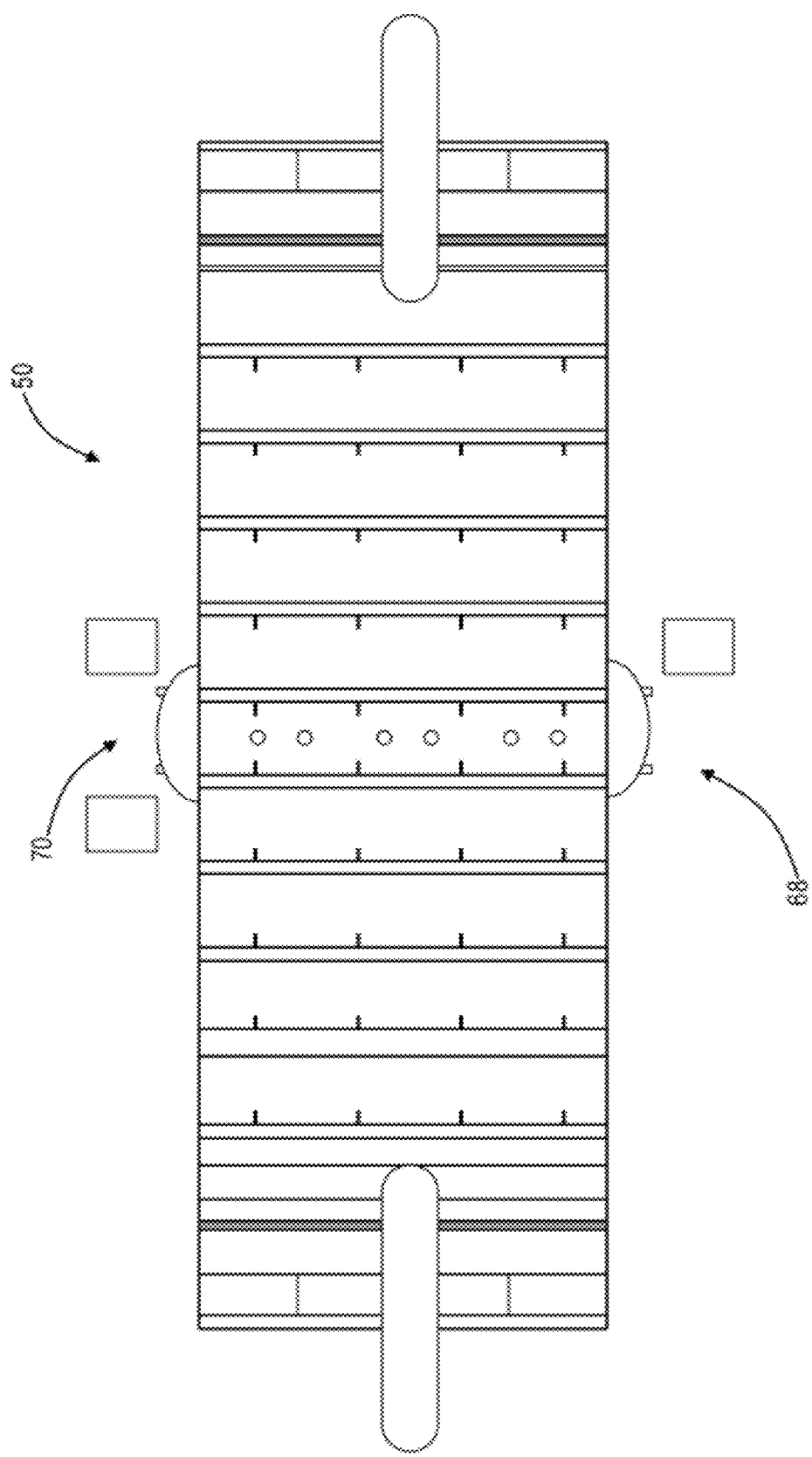
FIG. 5 is a schematic diagram (top view) illustrating one exemplary embodiment of the stationary non-tilting electric furnace of the present invention.

As before, in the side walls 62/bottom wall 64 of the furnace 50, near the centerline and distant from the raw material charging chutes 12 (i.e. distant from the raw material beds 66), a metal tap hole 68 and a slag tap hole 70 are provided to facilitate the tapping of molten metal 32 and molten slag 34. It should be noted that the metal tap hole 68 and slag tap hole 70 may be in any desired location in the lower portion of the furnace 50. As illustrated in FIG. 5, these holes 68, 70 may be located in the center of the bottom of the furnace 50. The electrodes 18 are preferably of a three-phase alternating-current type that has desirable heat efficiency, as is typically used in steel-making electric arc furnaces. As an example, an array of six electrodes 18 may be used, consisting of three pairs of electrodes 18 each of a single phase. The tip portion 36 of each electrode 18 is preferably submerged in the agglomerate layers 38 disposed on the raw material beds 66, or submerged in the molten slag 34, while conducting the melting operation. As a result, melting can be accelerated by the effects of radiant heat and resistance heat, and damage to the interior surfaces of the furnace 50 that are not protected by raw material beds 66 can be minimized.

In accordance with the present invention, the lower portion of the furnace 50 includes a plurality of discharge hoppers 80 located at various positions beneath the raw material and agglomerate layers 66, 38. These discharge hoppers 80 are selectively operated in-process or off-line to discharge a predetermined amount of the raw material (including agglomerates and fines) from the furnace 50, such that the material flow and position of the melting area in the furnace 50 can be controlled. The discharge operation is carried out using a slide gate and screw conveyor disposed beneath the discharge hoppers 80. If multiple slide gates are used with each discharge hopper 80, then material may be discharged from specific portions of the furnace 50 by opening one or more slide gates at a time.

In operation, it is necessary to control the material flow and the position of the melting area in the furnace 50 so that orderly, continuous operation of the furnace 50 can be maintained. Thus, in addition to the use of the discharge hoppers 80, the raw material charging chutes 12 are equipped with outer chutes 40 including feeding ports 42 that may be telescoped or otherwise adjusted vertically. Each raw material charging chute 12 includes a hopper 44 for storing the raw material, an inner chute 43 connected to the hopper 44, and an outer chute 40 that can be telescoped or otherwise adjusted vertically on the inner chute 43. The lower portion of the agglomerate layer 38 may be adjusted to occur at a desired position by moving the outer chutes 40 and feeding ports 42 in a vertical direction, depending on the angle of repose of the agglomerate layer 38.

Thus, the present invention provides a system and method for adjusting the lower portion of the agglomerate layer regardless of the changing angle of repose and collapse angle of the raw material bed and layer due to the segregation and/or accumulation of fines. Stable material flow from the feeding point to the melting area can be established and maintained for long term operation. This operation, especially when fines are removed from underneath the feeding point, is extremely effective. Even though the agglomerates are screened immediately before entering the feeding hopper, some amount of fines in the furnace is unavoidable. These fines tend to segregate and/or accumulate right at the feeding point. This material is similar in chemistry to the feed material, or is partially reduced. Even if it is partially reduced, it typically has a good balance between oxidant and reductant, and can typically be recycled. One method of recycling the reclaimed material is to simply mix it with new feed material entering the agglomeration equipment, requiring no new equipment. Another method of recycling the reclaimed material is to direct the reclaimed material to a new feed hopper and feed chute located opposite the tapping side of the furnace. Again, the preferable shape of the furnace is rectangular, where the refractory is protected by the DRI feed on two of the four sides. It is difficult to protect the tapping side of the furnace by maintaining a DRI layer because the tapping side of the furnace must have good hot metal and/or slag flow at the tap holes. Therefore, it is desirable to protect the tapping side of the furnace by water cooling. As an alternative, feeding the reclaimed material to this side of the furnace may also protect the refractory and reduce heat loss as compared to water cooling.

If the amount of removed material is too large, then the furnace will need the same amount of pre-reduction area as the two sides for material feed, for example. However, the amount of removed material is much less than the fresh feed and may be partially reduced. So melting the recycled material may be achieved by making a pile on the slag and hot metal layer underneath the new recycle hopper.

One important aspect of this type of electric melting furnace is the generation of foamy slag, which is created, in part, by gas that is evolved from the reduction reaction. Material may be recycled to an area that is adjacent to an electrode (such as between a pair of electrodes), resulting in the generation of CO gas by the reduction reaction and foamy slag. CaO may be added to the recycled material such that good de-sulfurizing performance is achieved. If limestone ($CaCO_3$) or dolomite ($CaCO_3$ and $MgCO_3$) is added to the recycled material instead of CaO, foamy slag may be generated using the resulting CO2. The limestone or dolomite may also be charged to the furnace independent of the recycled material.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for producing molten metal from a raw material comprising oxide agglomerates by reduction and melting in a furnace comprising:
   providing a raw material to a furnace;
   selectively removing a portion of the raw material from the furnace through one or more openings disposed in a bottom side thereof such that a raw material bed or layer has predetermined characteristics over time; and
   reducing and melting the raw material bed or layer in the furnace.

2. The method of claim 1, wherein the one or more openings are coupled to one or more hoppers.

3. The method of claim 1, further comprising recycling the portion of the raw material removed from the furnace back to the furnace as part of the raw material bed or layer.

4. The method of claim 1, further comprising recycling the portion of the raw material removed from the furnace back to the furnace as part of an additional raw material bed or layer.

5. The method of claim 3, further comprising adding an additive to the recycled material prior to reintroduction in to the furnace.

6. The method of claim 4, further comprising adding an additive to the recycled material prior to reintroduction in to the furnace.

7. The method of claim 1, wherein the furnace comprises a plurality of raw material charging chutes, a plurality of exhaust gas ducts, and a plurality of electrodes protruding through a top wall thereof, with the raw material charging chutes disposed adjacent to side walls of the furnace and the electrodes disposed at or near a centerline of the furnace.

8. The method of claim 1, wherein a top wall of the furnace has a step like configuration comprising a plurality of substantially-horizontal treads and a plurality of substantially-vertical risers.

9. The method of claim 8, wherein the top wall of the furnace further comprises a plurality of secondary combustion burners protruding through selected substantially-vertical risers in a substantially-horizontal configuration.

10. The method of claim 8, wherein the top wall of the furnace further comprises a plurality of secondary combustion burners protruding through selected substantially-horizontal treads in a substantially-vertical configuration.

11. The method of claim 1, wherein the selective removal is carried out while the furnace is in operation.

* * * * *